US009625323B2

United States Patent
Sartorius et al.

(10) Patent No.: US 9,625,323 B2
(45) Date of Patent: Apr. 18, 2017

(54) METHOD FOR DETERMINING THE RELATIVE TEMPORAL POSITION OF ELECTROMAGNETIC PULSES AND DETERMINATION DEVICE

(71) Applicant: FRAUNHOFER-GESELLSCHAFT ZUR FOERDERUNG DER ANGEWANDTEN FORSCHUNG E.V., München (DE)

(72) Inventors: Bernd Sartorius, Berlin (DE); Roman Dietz, Berlin (DE); Helmut Roehle, Berlin (DE)

(73) Assignee: FRAUNHOFER-GESELLSCHAFT ZUR FÖDERERUNG DER ANGEWANDTEN FORSCHUNG E.V., München (DE)

(*) Notice: Subject to any disclaimer, the term of this patent is extended or adjusted under 35 U.S.C. 154(b) by 86 days.

(21) Appl. No.: 14/431,736

(22) PCT Filed: Sep. 24, 2013

(86) PCT No.: PCT/EP2013/069832
§ 371 (c)(1),
(2) Date: Mar. 26, 2015

(87) PCT Pub. No.: WO2014/048912
PCT Pub. Date: Apr. 3, 2014

(65) Prior Publication Data
US 2015/0253199 A1    Sep. 10, 2015

(30) Foreign Application Priority Data
Sep. 27, 2012  (DE) .................. 10 2012 217 655

(51) Int. Cl.
*G01J 11/00*     (2006.01)
*H01S 3/00*      (2006.01)
*H01S 3/23*      (2006.01)

(52) U.S. Cl.
CPC ............ *G01J 11/00* (2013.01); *H01S 3/0014* (2013.01); *H01S 3/2383* (2013.01)

(58) Field of Classification Search
CPC ....... G01J 11/00; H01S 3/0014; H01S 3/2383
See application file for complete search history.

(56) References Cited

U.S. PATENT DOCUMENTS 5,353,149 A    10/1994  Urakami et al.
6,204,926 B1   3/2001   Maznev et al.
(Continued)

FOREIGN PATENT DOCUMENTS

DE    69306706 T2    5/1997
EP    0 790 492 A2   8/1997
(Continued)

OTHER PUBLICATIONS

Posthumus., "Low-Jitter Laser Synchronisation and ECOPS," TOPTIC Photonics AG, Jan. 2007, pp. 1-6.
(Continued)

*Primary Examiner* — Mark R Gaworecki
(74) *Attorney, Agent, or Firm* — Maschoff Brennan

(57) ABSTRACT

The invention relates to a method for determining the relative temporal position of electromagnetic pulses. Said method having the steps generating a sequence of first electromagnetic pulses, generating a sequence of second electromagnetic pulses, overlaying at least a part of the first and the second pulses in a saturable absorber, detecting the second pulses that have passed through the saturable absorber by means of a detector in such a manner that the second pulses, but not the first pulses that have passed (Continued)

through the saturable absorber, are detected, and determining the temporal position of the first pulses relative to the temporal position of the second pulses with the aid of a signal from the detector which is generated when the second pulses that have passed through the saturable absorber are received.

19 Claims, 14 Drawing Sheets

(56) References Cited

U.S. PATENT DOCUMENTS

| | | | |
|---|---|---|---|
| 6,775,482 B1 * | 8/2004 | Shimomura | H04B 10/299 398/182 |
| 7,397,567 B2 | 7/2008 | Kaertner et al. | |
| 2004/0051933 A1 | 3/2004 | Tatsuura et al. | |

FOREIGN PATENT DOCUMENTS

| | | |
|---|---|---|
| EP | 1 128 593 A2 | 8/2001 |
| WO | 97/00429 A1 | 10/1997 |

OTHER PUBLICATIONS

"Terahertz with Electronic Delay", Optik-Photonik, Wiley, vol. 2, Issue 4, pp. 29-31, Dec. 2007.
"Long-term femtosecond timing link stabilization using a single-crystal balanced cross correlator" J. Kim et al., Optics Letters, vol. 32, Issue 9, pp. 1044-1046 (2007).

* cited by examiner

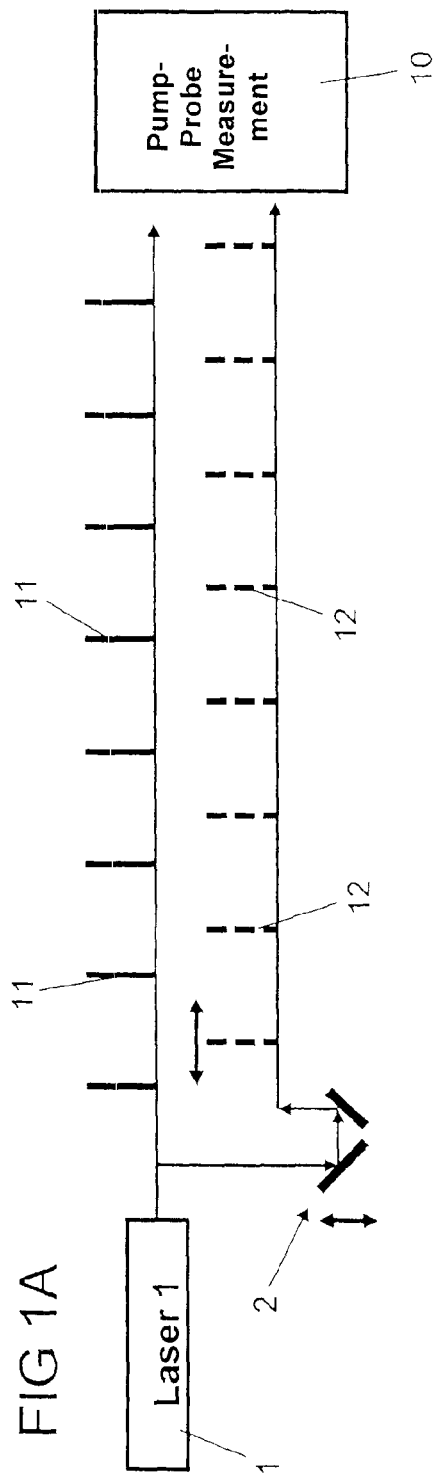
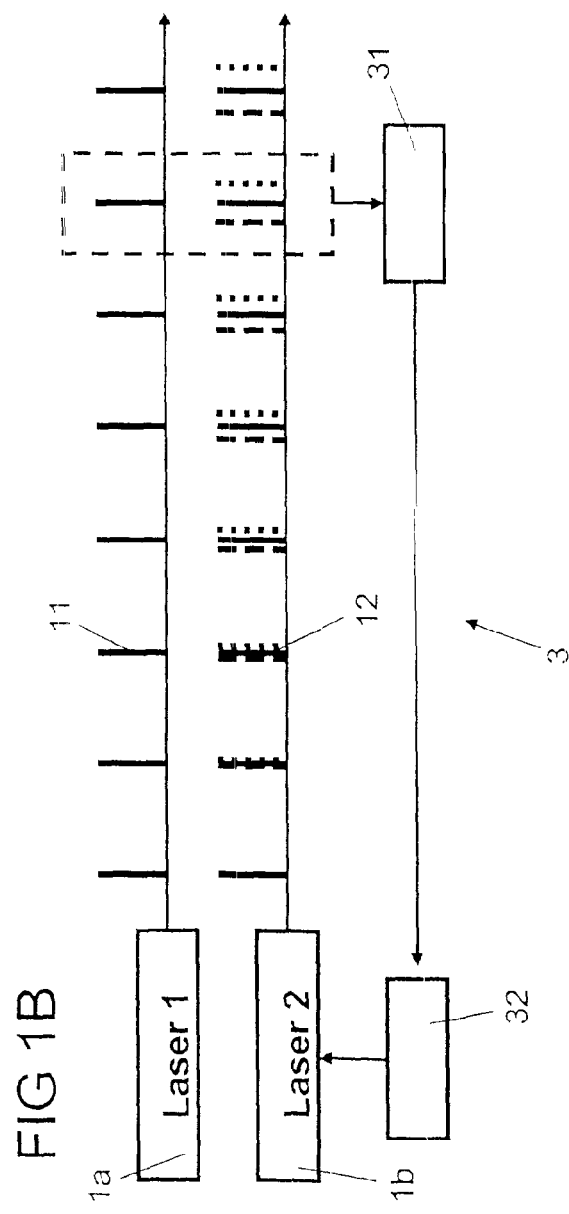

METHOD FOR DETERMINING THE RELATIVE TEMPORAL POSITION OF ELECTROMAGNETIC PULSES AND DETERMINATION DEVICE

CROSS-REFERENCE TO A RELATED APPLICATION

This application is a National Phase Patent Application of International Patent Application Number PCT/EP2013/069832, filed on Sep. 24, 2013, which claims priority of German Patent Application Number 10 2012 217 655.1, filed on Sep. 27, 2012.

BACKGROUND

This invention relates to a method for determining the relative temporal position of electromagnetic pulses and to a determination device for carrying out such method.

From the prior art, it is known to determine the relative temporal position (phase) of two electromagnetic pulses (or two pulse trains), in order to be able to adjust or control the temporal position of the pulses (e.g. two light pulses). For example, measurements will be made by varying the relative temporal position of the pulses, e.g. in pump-and-probe measurements. Here, a first pulse (pump pulse) excites an effect (i.e. it causes an electromagnetic pulse) and a second, variably delayed pulse (probe pulse) samples the time behavior of the electromagnetic pulse (i.e. of the effect) caused by the first pulse.

For example, terahertz pulse systems also operate according to the pump-probe principle: A first pulse excites a photoconducting transmitting antenna to emit terahertz radiation and a second pulse samples the signal received from a second photoconducting detector antenna with variable delay. Other pump probe measurements proceed from a pulse source (e.g. a pulse laser) whose pulsed radiation is split up into two paths, wherein in one of the two paths a (e.g. mechanical) delay line is arranged. Instead of a (relatively slow) delay mechanism, other systems employ an arrangement for varying the repetition frequency of the pulse source: When a first pulse source with a repetition frequency $f_1$ generates the pump pulses and a second pulse source with a repetition frequency $f_2$ generates the probe pulses, the relative temporal position of the pulses remains constant when the repetition frequencies $f_1$ and $f_2$ are equal. When one of the frequencies becomes smaller, the corresponding pulses overtake the other pulses; when the frequency becomes larger, the pulses fall back again. However, this method requires a synchronization of the two pulse sequences generated by the two pulse sources.

One possibility of synchronizing the two pulse sequences consists in the direct detection of the pulses with detectors which cannot resolve the pulses temporally, but can follow the repetition rate. With downstream electronic microwave components and techniques the phase and/or frequency deviations then are detected and control signals are generated (J. Posthumus, "Terahertz with Electronic Delay", Optik-Photonik, Wiley, 2007, pp. 29-31).

It is also known to irradiate the pulse sequences into a non-linear crystal as "time correlator", wherein the sum frequency (or double the frequency) of the electromagnetic light wave only is obtained when the pulse sequences simultaneously and synchronously pass through the non-linear crystal. The power of the radiation generated in the non-linear crystal therefore indicates the time correlation of the two pulse sequences (J. Kim et al., Optics Letters, Vol. 32, 9, pp. 1044-1046, 2007).

SUMMARY

The problem to be solved by the invention consists in indicating a method for synchronizing electromagnetic pulses as inexpensive and simple as possible. Furthermore, a corresponding device is to be created.

These problems are solved by creating the method with the features as described herein and the device with the features as described herein.

Accordingly, there is provided a method for determining the relative temporal position of electromagnetic pulses, which includes the following steps:

generating a sequence of first electromagnetic pulses;
generating a sequence of second electromagnetic pulses;
overlaying the first and the second pulses in a saturable absorber;
detecting the second pulses that have passed through the saturable absorber by means of a detector in such a manner that the second pulses, but not the first pulses that have passed through the saturable absorber, are detected; and
determining the temporal position of the first pulses relative to the temporal position of the second pulses by means of a signal of the detector generated upon receipt of the second pulses that have passed through the saturable absorber.

Saturable absorbers are components which become more transparent with increasing power of the irradiated pulses and in particular can be operated purely passively, i.e. without any supply electronics. For example, a saturable absorber can be formed on the basis of thin semiconductor layers (e.g. with a thickness in the range of 1 μm, so that a compact component to be realized at low cost is available. The invention however is of course not limited to the use of a particular kind of saturable absorbers. In particular, however, there can be used saturable absorbers whose absorption is not dependent on the irradiation direction or on the polarization of the pulses.

The electromagnetic pulses for example are light pulses (e.g. visible or infrared). It is, however, also conceivable that the invention is used with other electromagnetic pulses, e.g. with the terahertz pulses already mentioned above. The duration of the pulses lies e.g. in the pico- or femtosecond range.

The determination of the relative temporal position of the pulses can comprise a detection of a change, in particular a rise (in particular a quick-rising edge), of the detector signal. It is conceivable that a detector is used which only responds to a variation of the input intensity, e.g. an AC (alternating current)-coupled detector.

It should be noted that the determination of the "relative temporal position" does not necessarily mean that the exact temporal distance of the first to the second pulses is determined. Rather, determining the relative temporal position also can mean that merely an information on the temporal distance between the first and the second pulses is determined; i.e. in particular whether the first pulses precede the second pulses (or vice versa), i.e. there is merely determined an order of the first pulses as compared to the second pulses, or whether the pulses arrive at the same time (at a defined place). It is also conceivable that merely a classification of the temporal distance between the first and the second pulses is made, wherein it is determined for example whether the temporal distance is greater or smaller than a limit value.

By using the determined relative temporal position, a synchronization of the first and the second pulses for example is made. The invention, however, need not necessarily be used for pulse synchronization. Rather, it is also conceivable that the temporal distance of the pulses merely is measured, in order to obtain e.g. information on properties (e.g. noise) of the pulses or a pulse system.

In contrast to the above-mentioned non-linear crystals, which quickly follow the irradiated pulses, saturable absorbers have longer recovery times. For this reason, it would have to be expected that they are not suitable for a use for determining the relative temporal position of two (fast) pulses (or two pulse trains) and in particular for the synchronization of two pulses, as signal blurring is to be reckoned with. The present invention, however, makes use of the property of the saturable absorbers that the lifting of charge carriers into the conduction band during irradiation of the pulses is a very fast process, so that the transmission of the saturable absorber upon irradiation of a fast pulse likewise rises quickly, i.e. has a steep rising edge, which e.g. at least approximately follows the course of the rising edge of the irradiated electromagnetic pulse.

Due to the fact that only the second pulses are detected by the detector, the steep rising edge of the absorber transmission (i.e. the steep course of the absorption saturation) substantially is utilized, so that the relatively slow recovery of the absorber (i.e. the decrease of its transmission) does not disturb. The first pulses (which can be e.g. the above-mentioned pump pulses) only have a significant influence on the transmission of the second pulses (which are e.g. probe pulses) through the saturable absorber, when they reach the saturable absorber simultaneously with or just before the second pulses. In this case, the absorption by the first pulses is reduced (e.g. saturated), so that an increased transmission of the second pulses (i.e. an increased intensity at the detector) will be detected. However, when the first pulses arrive at the saturable absorber only after the second pulses, the same have no influence on the transmission of the second pulses. In this case, the second pulses would have an influence on the first pulses.

The power (in particular the increase in power) of the second pulses that have passed through the saturable absorber, which arrives at the detector, therefore contains information on the time correlation between the first and second pulses; in particular, this is effected with high precision, since the increase in absorber transmission, as mentioned, e.g. at least substantially follows the pulse steepness. It therefore is sufficient when the detector has a speed which corresponds to a variation of the relative phase (temporal position) between the first and the second pulses; hence it need not necessarily be able to follow the repetition frequency, and even less the steepness of the pulses.

The detector signal used for determining the relative temporal position of the first and the second pulses (in particular for synchronizing the pulses) for example at least approximately corresponds to a power of the second pulses that have passed through the saturable absorber, which is averaged over several pulses. The integral power of the second pulses (i.e. the mean power of the pulses each) in particular is smaller than the integral power of the first pulses, in order to minimize a saturation of the absorber by the second pulses. For example, the mean power of a pulse of the first pulses is greater than the integral power of a pulse of the first pulses by the factor of 2, in particular by the factor of 5 or 10. When using a correspondingly slow detector, the detected power however can be at least approximately constant, even if on penetration of the saturable absorber with the second pulses self-saturation occurs, since the detector will not detect the steep rising edge of the pulses, but only the integral power.

Correspondingly, the determination of the relative temporal position (e.g. the synchronization) of the first and the second pulses can comprise a detection of rising edges and/or maxima of the intensity arriving at the detector. The detected (in particular fast, e.g. taking place within pico- or femtoseconds) rises in intensity are obtained due to the described fast saturation of the absorber, if the first pulses arrive at the saturable absorber before the second pulses or simultaneously with the second pulses.

It is conceivable that the first and the second pulses are mapped onto a relatively small area (e.g. a spot with a diameter in the range of 10 µm) of the saturable absorber, in which they overlay each other; in particular when small powers are to be used.

According to one aspect of the method according to the invention, the above-mentioned synchronization of the first and the second pulses is effected by an (automatic) control which in dependence on the detector signal varies the relative temporal position of the first and/or the second pulses and/or the repetition frequency of the first and/or the second pulses. It is, however, also conceivable that the detector signal is utilized, in order to vary the temporal position and/or the repetition frequency by manual adjustment of a setting of a component of a set-up (for example a pulse source with which the pulses are generated). Varying the temporal position and/or the repetition frequency in particular can serve to compensate a temporal drift of the first and the second pulses (e.g. the maxima of the pulses). It is also conceivable that the amplitude of a frequency modulation impressed e.g. upon the frequency of the second pulses is varied.

For example, a value of the detector signal is detected at a defined point in time after the beginning of a rise (and e.g. before reaching a maximum) and e.g. the repetition frequency, the relative temporal position of the first and/or the second pulses and/or a frequency modulation impressed upon the frequency of the second pulses is varied in dependence on this value (e.g. when the value exceeds a specifiable limit value).

As pulse sources for generating the first and the second pulses, e.g. pulse lasers are used, wherein the repetition frequency is defined by the length of the laser resonator. The repetition frequency therefore can be adjusted by varying the resonator length, e.g. by mirrors which are adjustable by means of piezo elements. For controlling the piezo elements the detector signal now can be used, from which it can be taken whether the pulses have the same temporal position. An initially determined value is not sufficient for this purpose, as many components (e.g. waveguides, piezo elements, electronics, etc.) of a set-up which utilizes electromagnetic pulses can have a drift, e.g. due to a change in temperature, wherein already small frequency deviations after few pulses can lead to an unwanted and unknown time offset between the first and the second pulses. By means of the detector signal, the operating point of the same temporal position of the first and the second pulses can be determined and e.g. a corresponding control signal can be generated, as mentioned already.

According to a further exemplary embodiment of the invention, the first and the second pulses are irradiated into the saturable absorber at an angle to each other, wherein the detector is arranged on the propagation axis of the second pulses. For example, behind the saturable absorber only the pulses exiting from the saturable absorber in continuation of the propagation direction of the second pulses (i.e. the second pulses that have passed through the saturable absorber) are mapped into the detector by one or more imaging elements (e.g. lenses or mirrors). According to another realization of the invention waveguides are utilized, in order to lead the first and/or the second pulses to the saturable absorber; e.g. in silicon or polymer technology. For example, the saturable absorber is arranged (in particular fixed, e.g. glued) on an end face of such waveguide or in a saw groove of a substrate with the waveguide. It is conceivable that waveguides in the form of optical fibers are used, which e.g are inserted and fixed (e.g. glued) in etched trenches of a substrate (platform).

In another development of the invention, the first and the second pulses run through the saturable absorber in opposite directions, wherein the second pulses that have passed through the saturable absorber are passed onto the detector via a circulator. For example, the saturable absorber is arranged between two waveguides (for example in the form of optical fibers), wherein the ends of the waveguides facing the saturable absorber can be provided with imaging elements (e.g. an optical system). The second pulses then are passed via the circulator into a third waveguide (e.g. a further optical fiber) and via the same passed to the detector.

It is also possible that the first and the second pulses are polarized differently, wherein it is prevented by means of a polarizing filter that the first pulses get to the detector. For example, the first pulses have a polarization orthogonal to the polarization of the second pulses. Behind the saturable absorber, the first pulses are blocked by a correspondingly oriented polarization filter, so that only the second pulses reach the detector. For example, this solution is realized in waveguide technology (e.g. fiber technology), wherein e.g. via polarization-maintaining fibers the first and second pulses each are coupled from the outputs of a pulse source (e.g. in the form of a femtosecond laser) via polarization splitters/combiners into the TE or TM axis of a common polarization-maintaining waveguide (e.g. optical fiber) and in the same direction are passed onto the saturable absorber. The saturable absorber (e.g. in the form of a chip) can directly be adhered to an output facet of the common waveguide. The polarizing filter can be connected with the detector, and this unit can be placed directly behind the saturable absorber; in particular, in order to create a very compact and inexpensive arrangement.

According to another embodiment of the invention, a sequence of third pulses is generated from the first or the second pulses, which are irradiated into the saturable absorber with a specified time delay with respect to the first or the second pulses. It is conceivable that the temporal distance of the rising edges or maxima occurring in the detector signal (e.g. due to the second and the third pulses) is used for time calibration with respect to the second pulses.

For generating the third pulses, one of the two pulse sequences in particular is split up into two parts (partial beams) (e.g. by using a beam splitter), wherein one of the partial beams (i.e. the third pulses) is delayed by a defined path or by a defined time and the two partial beams are joined again. The radiation (pulse sequence) joined again then is irradiated into the saturable absorber.

Thus, a twofold correlation exists between the first and second pulses, of which the first pulses produce a steep rise of the absorber saturation and hence of the transmission of the second pulses. Since the temporal distance between the third pulses and the pulses from which they were generated (i.e. the first and the second pulses), and hence the distance of the two correlation points (i.e. the maxima of the detector signal or a defined point of the rising edges) is known, a system (in particular a corresponding electronic system) in which the method according to the invention is used now can be scaled with respect to the time axis. Beside the third pulses additional further pulse sequences with defined temporal delay can of course be generated, in order to produce a time ruler and for example to obtain more precise time scales (time calibrations) in the case of non-linear, e.g. sinusoidal, modulations of the frequency or the phase of the first and/or the second pulses.

In particular, the second pulses each are split up into several pulses, whereby the power of the individual pulses becomes smaller, and with the number of the further pulses generated from the second pulses, also increasingly smaller with respect to the first pulses. One aspect of this variant is based on a waveguide platform, wherein for example splitters, delay lines and couplers are realized with high precision and robust, and e.g. several stages with different delay can be connected in series. Another conceivable realization of this variant is based on pulse sequences (i.e. the sequences with the first or second pulses) with defined linear polarization. Here, birefringent elements (i.e. elements with different propagation speed for TE and TM modes) can be utilized, e.g. polarization-maintaining fibers ("PM fibers"). When radiation is irradiated into such element at an angle of 45°, a fast and a slow wave will form. After a suitable distance, the desired time offset is reached, and the double pulses (i.e. the third pulses and those pulses from which they were generated) subsequently can be guided in a medium with the same propagation speed.

According to another aspect of the method of the invention, the first pulses also are detected by means of a further detector, wherein the determination of the relative temporal position of the first and the second pulses (e.g. the synchronization of the first and the second pulses) is effected in dependence on a difference of the signals of the two detectors ("balanced detection"). This variant can be used e.g. for a control on a fixed operating point, such as when synchronizing to a master laser, wherein with reference to the detector signal not only the point of the optimum synchronization can be determined, but in the case of a deviation from the desired synchronism also the required control direction. It is conceivable that the further (second) detector is formed analogous to the (first) detector with which the second pulses are detected; in particular as slow detector which averages over a plurality of pulses.

As in this variant of the invention both the effect of the first pulses (together with the saturable absorber) on the second pulses and the effect of the second pulses on the first pulses is detected symmetrically, it is conceivable that the first and the second pulses at least approximately have the same power. In particular the following cases are possible:

i) The first pulses reach the saturable absorber before the second pulses, so that (within the slow recovery time of the saturable absorber) exclusively the first pulses each have an effect on the second pulses; and the transmission of the saturable absorber for the second pulses is increased.

ii) The second pulses reach the saturable absorber before the first pulses, so that only the second pulses have an effect on the first pulses, and now the saturable absorber has a higher transmission for the first pulses.

The difference between the (in particular averaged) intensity of the second pulses arriving at the second detector, that have passed through the saturable absorber, and the intensity of the first pulses arriving at the first absorber, that likewise have passed through the saturable absorber, is positive in the case i) and negative in the case ii). When the pulses overlay each other in the saturable absorber exactly at the same time, the difference is zero.

The difference signal thus both indicates the exact simultaneity with high precision and in the case of a deviation the required control direction for correcting the difference in the temporal position. It should be noted that here no extra time offset must be produced between the signals of the two detectors, such as in the above-mentioned use of a non-linear crystal as time correlator. The unsymmetric characteristic curve of the saturable absorber here is utilized for indicating the control direction.

It should be noted that each of the above-described design variants can of course also be provided with a second detector for detecting also the first pulses, i.e. as design for the balanced detection. When the first and the second pulses for example are irradiated into the saturable absorber at an angle, the further detector is arranged in the axis of the first pulses irradiated into the saturable absorber or at least one imaging or conducting element is arranged such that the first pulses that have passed through the saturable absorber (and not the second pulses) are passed onto the further detector. This can of course also be realized with the described (in particular planar) waveguide platform, with which e.g. the adjusting effort can be reduced and a compact and robust device can be realized.

In arrangements with oppositely directed irradiation into the saturable absorber, a further circulator must be provided, via which the first pulses that have passed through the saturable absorber e.g. are coupled into a further glass fiber and guided to the further detector. In the arrangement utilizing orthogonal polarizations of the pulse sequences, the polarizing filter in front of the detector must be replaced by a polarization splitter and the further detector must be mounted on the second splitter output.

The invention also relates to a determination device for carrying out the method of the invention according to one of the above-described variants, i.e. for determining the relative temporal position of electromagnetic pulses, comprising
  at least one pulse generating device for generating a sequence of first electromagnetic pulses and a sequence of second electromagnetic pulses;
  a saturable absorber in which the first and the second pulses can be overlaid;
  a detector for detecting pulses that have passed through the saturable absorber, wherein the detector is formed and arranged such that it detects the second pulses that have passed through the saturable absorber, but not the first pulses that have passed through the saturable absorber.

It is possible that the determination device includes a detection unit which detects a change in the detector signal, in particular rising edges, and/or maxima of the detector signal and hence of the intensity of the second pulses arriving at the detector, as described above in connection with the method according to the invention. In addition, the pulse generating device can include at least one fiber laser for generating the first and the second pulses, which emits e.g. in a wavelength range from 1030 nm to 1600 nm. For example, the determination device according to the invention is part of a synchronization device for synchronizing the first and the second pulses, as described above.

The invention also comprises a pump-probe system (e.g. a terahertz system) with such synchronization device. In addition, the invention also comprises a system with a master laser and at least one local pulse laser (e.g. positioned at a distance from the master laser) which is synchronized with the master laser by means of the synchronization device. In particular, the synchronization device is formed according to the above-described principle of the balanced detection, i.e. it includes two detectors.

BRIEF DESCRIPTION OF THE DRAWINGS

The invention will subsequently be explained in detail by means of exemplary embodiments with reference to the Figures.

FIGS. 1A, 1B show possible applications of the invention.

DETAILED DESCRIPTION

Figure 2:
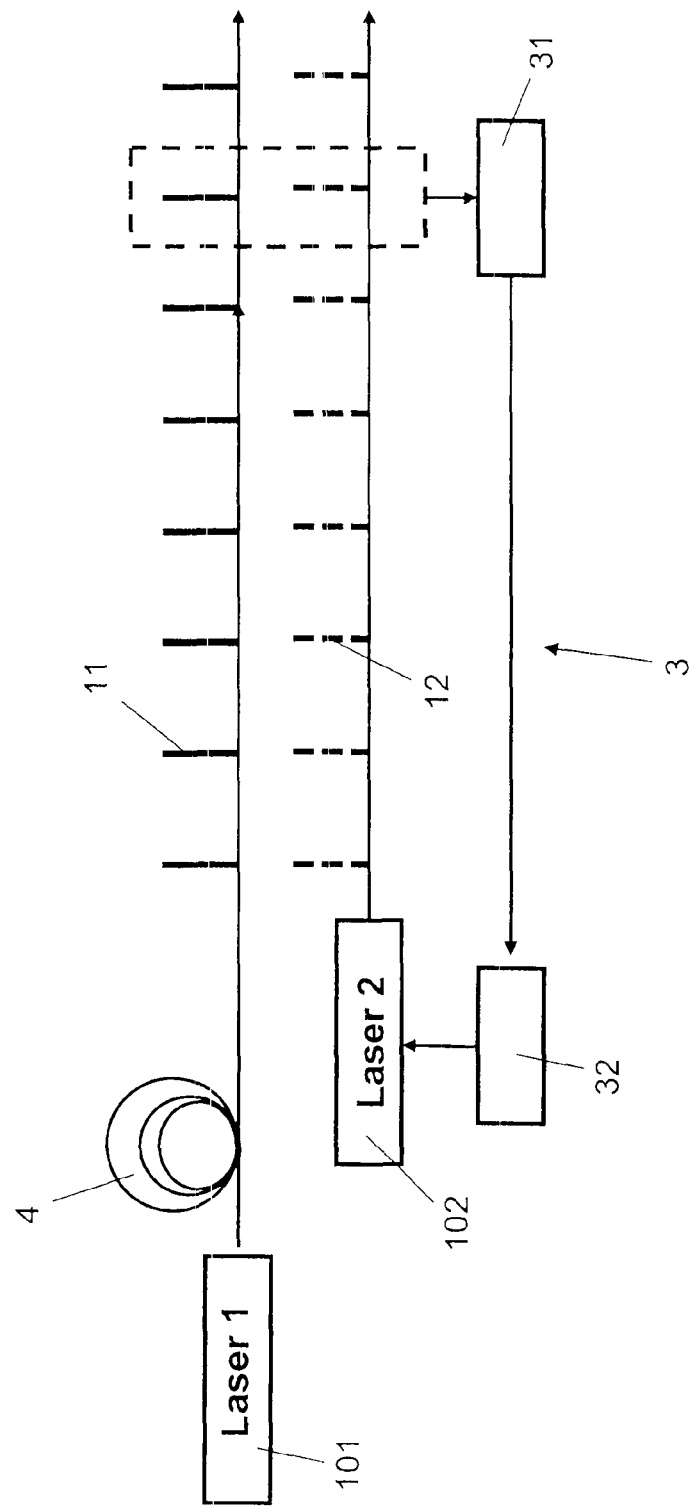
FIG. 2 shows a further possible application of the invention.

FIG. 1A shows a schematic representation of a conventional pump-probe system which comprises a laser 1 with which a sequence of first optical pulses 11 is generated. A part of the intensity of the pulses 11 is split up, in order to generate a sequence of second pulses 12 which are temporally delayed with respect to the first pulses 11 by means of a delay line 2. With the first pulses 11 (pump pulses) e.g. a specimen is irradiated, wherein the pulsed light emission excited in the specimen is sampled with the second pulses 12 (probe pulses) (box 10 "pump-probe measurement").

An alternative system for carrying out a pump-probe measurement is shown in FIG. 1B. There is no mechanical delay of the pulses, but sequences of first and second pulses 11, 12 with repetition frequencies $f_1$ and $f_2$ are generated with two lasers 1a, 1b. The repetition frequency $f_2$ of the sampling pulses 12 is changed by a value of d (in particular periodically, e.g. abruptly), so that the sampling pulses 12 are (temporally) guided over the first pulses 11. The set-up shown in FIG. 2 comprises a synchronization device 3 (in particular according to the invention) which synchronizes the first and the second pulses 11, 12. For this purpose, the synchronization device 3 comprises a time correlator 31 with which the relative temporal position of the first and the second pulses 11, 12 can be determined, and a controller 32 which in dependence on signals of the time correlator 31 varies e.g. the center repetition frequency $f_1$ and/or the amplitude d of the repetition frequency modulation.

FIG. 2 shows a further system in which the present invention can be used. For generating a sequence of first pulses 11, the system includes a first pulse laser 101 (master laser) and at least one second pulse laser 102 (slave laser) for generating second pulses 12, which is positioned at a distance from the first laser 101. The repetition frequencies of the two lasers 101, 102 are e.g. identical.

The first pulses 11 generated by the first laser 101 are passed to the location of the second laser 102 e.g. via a glass fiber 4. Like the pump-probe arrangement of FIG. 1B, the system includes a synchronization device 3 (in particular according to the invention) which synchronizes the first and the second pulses 11, 12 via a time correlator 31 and a controller 32. In particular, the temporal position and/or the repetition frequency of the second pulses 12 are varied by the controller 32. It is also possible that the master laser and the slave laser have different wavelengths, as far as the same lie in the spectral absorption range of the absorber.

It is also possible that the first and second pulses originate from the same laser, but due a delay line one of the pulse sequences is delayed by a multiple of the pulse distance. Then, the temporal drift of frequency and phase is determined and the same can be minimized by readjustment. The arrangement thus can be utilized for frequency and phase stabilization of a laser.

Figure 3:
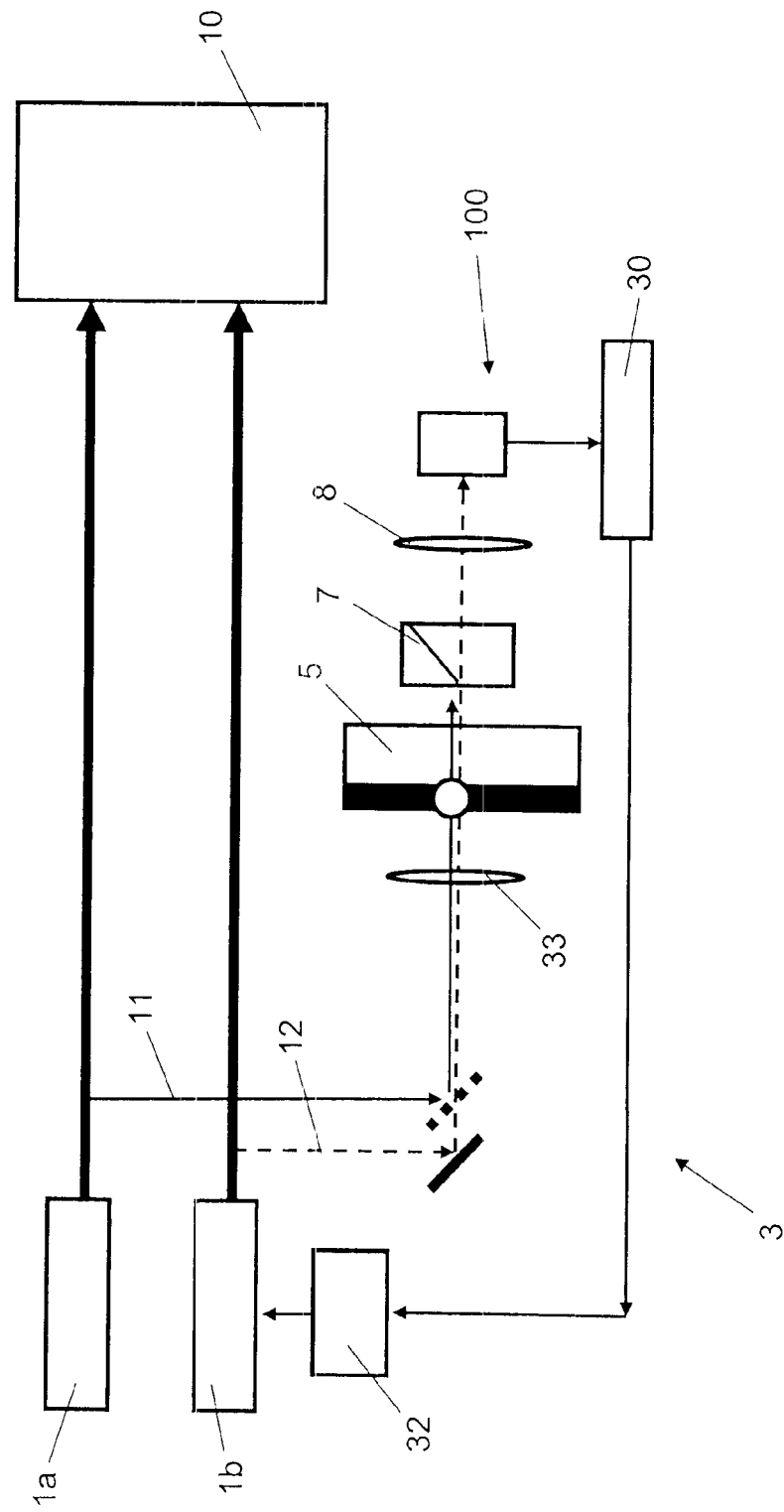
FIG. 3 schematically shows a first exemplary embodiment of the determination device according to the invention.

FIG. 3 illustrates a pump-probe system which includes a determination device 100 according to the invention as part of a synchronization device 3. The determination device 100 comprises a time correlator in the form of a saturable absorber 5 in which first and second pulses 11, 12 generated by a first and a second laser 1a, 1b are overlaid. For this purpose, a part of the pulse intensity originally generated by the lasers is coupled out by means of a corresponding optical element (e.g. a beam splitter) and irradiated into the saturable absorber 5 via an optical imaging system 33, wherein the first and the second pulses 11, 12 are overlaid in a section of the saturable absorber 5.

The light that has passed through the saturable absorber 5 is detected by means of a detector 6, wherein however only either the first or the second pulses 11, 12 (here the second pulses 12) get to the detector 6, since the light of the respectively other pulses is blocked via correspondingly formed optical components 7 (filter, beam splitter, etc.). The non-blocked light of the second pulses 12 is radiated onto the detector 6 e.g. via a further optical imaging system 8.

The course of the intensity of the second pulses 12 that have passed through the saturable absorber 5 contains information on the relative phase between the first and second pulses 11, 12. A detection unit 30 detects the detector signal generated upon arrival of the second pulses 12 at the detector, wherein a controller 32 actuates the laser 1b in dependence on a signal of the detection unit 30 (and hence also in dependence on the detector signal), in order to vary e.g. the phase and/or the repetition frequency of the second pulses 12.

Figure 4:
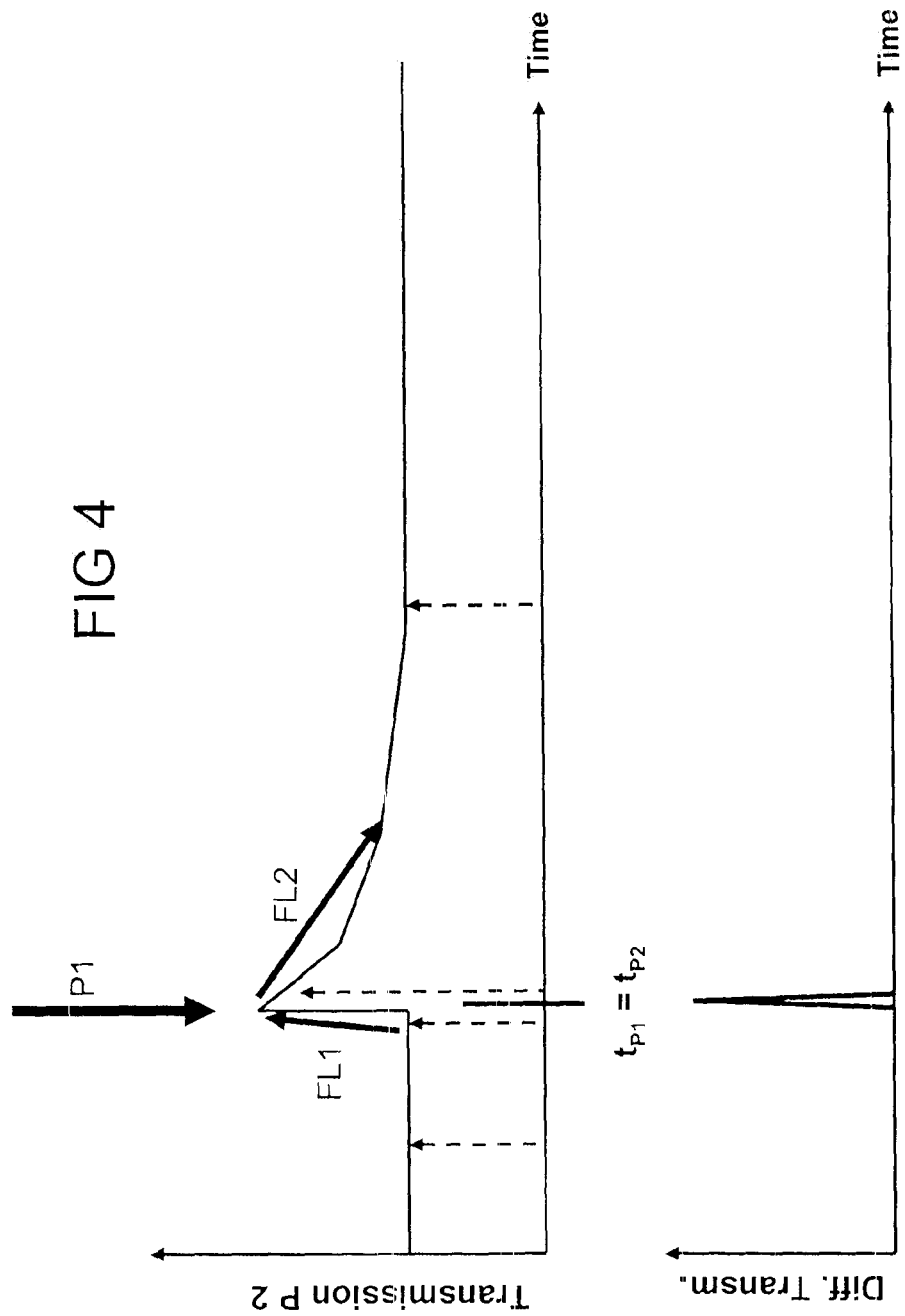
FIG. 4 shows an exemplary transmission of a saturable absorber.

The detector 6, as already mentioned above, in particular is a slow detector as compared to the pulses 11, 12, which in so far generates a signal dependent on an intensity mean value. Due to the fast saturation of the saturable absorber, the detector signal substantially will register a change in the signal arriving at the same, i.e. a change in the transmission of the saturable absorber, as shown in FIG. 4 (see the bottom representation of FIG. 4, which shows the differential transmission of the absorber over time as demonstrated with the detector 6).

The invention makes use of the property of the saturable absorbers that the lifting of charge carriers into the conduction band during irradiation of the pulses is a very fast process, so that the transmission of the saturable absorber upon irradiation of a fast pulse likewise rises quickly, i.e. has a steep rising edge, which e.g. at least approximately follows the course of the rising edge of the irradiated electromagnetic pulse.

As already explained above, the steep rising edge of the absorber transmission (cf. FIG. 4, arrow FL1 in the range of e.g. 50 fs) is utilized due to the fact that only the second pulses 12 are detected by the detector 6, so that the relatively slow recovery of the absorber (i.e. the decrease of its transmission) does not disturb (arrow FL2, e.g. in the range of 5 ps). The first pulses 11 only influence the transmission of the second pulses 12 through the saturable absorber 5, when they reach the saturable absorber 5 simultaneously with or just before the second pulses 12 (arrow P1, for "first pulses").

In this case, the absorption of the second pulses 12 by the saturable absorber 5 is reduced due to the effect of the first pulses 11 on the saturable absorber 5 (e.g. the absorber 5 is saturated by the first pulses 11), so that an increased transmission of the second pulses 12 through the absorber 5 is effected and as a result a rise in the intensity at the detector 6 and correspondingly of the detector signal is generated. This is shown in the upper drawing of FIG. 4, which shows the transmission of the second pulses 12 through the saturable absorber 5 (i.e. the course of the detector signal) in dependence on the time for the case that the first pulses 11 arrive in the absorber 5 simultaneously with the second pulses 12 or shortly before the second pulses. However, when the first pulses 11 arrive at the saturable absorber 5 only after the second pulses 12, they have no influence on the transmission of the first pulses 11 through the absorber 5.

A fast rise of the detector signal (e.g. in the femtosecond range) thus indicates a change in the relative temporal position of the first and the second pulses 11, 12, so that from the detector signal a control signal can be generated, with which a control of the second laser 1b is effected. Correspondingly, the detection unit 30 in particular is formed to detect a fast rise of the detector signal.

Figure 5:
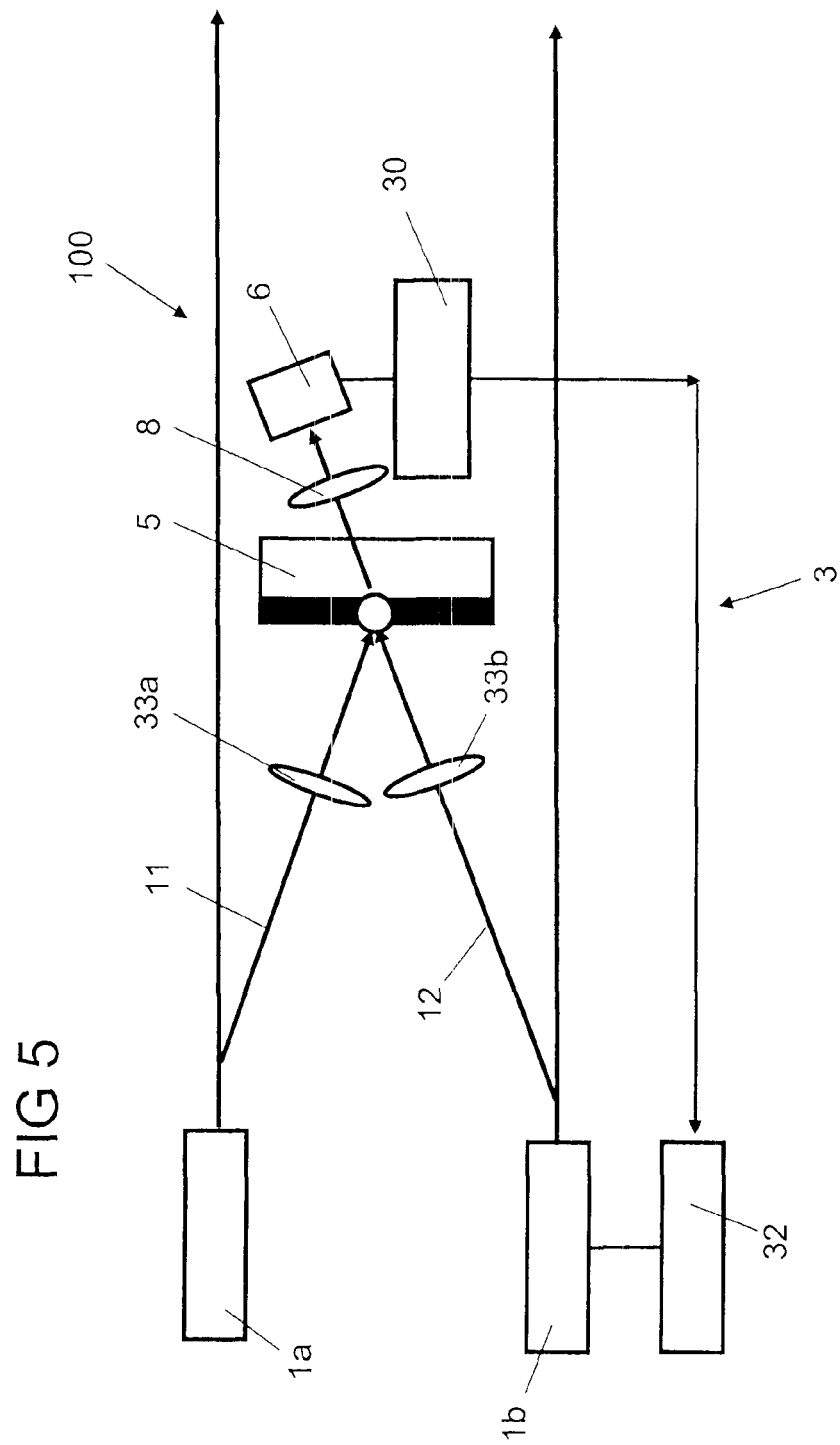
FIG. 5 shows a second exemplary embodiment of the determination device according to the invention.

FIG. 5 shows an alternative configuration of the determination device 100. The first and the second pulses 11, 12 here are irradiated into the saturable absorber 5 at an angle, wherein they are each mapped onto a common region of the absorber 5 via an optical imaging system 33a, 33b. The detector 6 is located on the propagation axis of the second pulses 12, so that the second pulses 12 that have passed through the saturable absorber 5 are mapped into the detector 6 (via an optical imaging system 8), but the first pulses 11 run past the detector 6.

Figure 6:
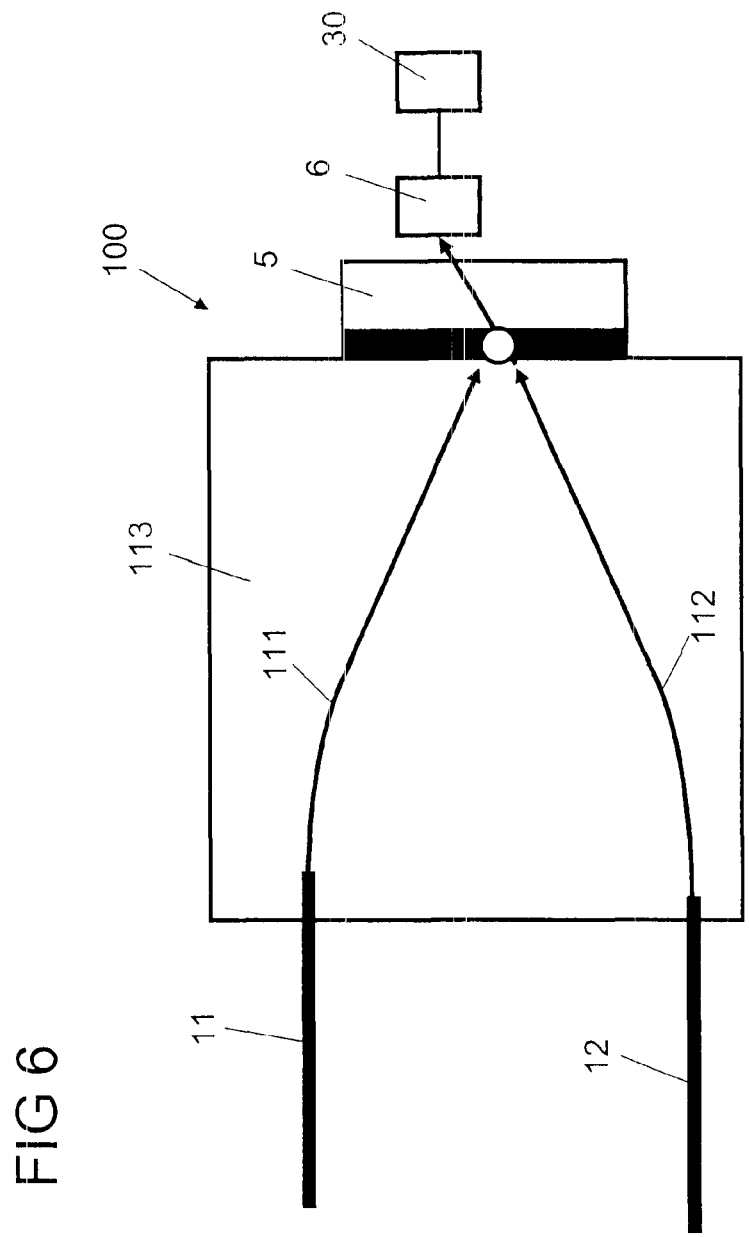
FIG. 6 shows a third exemplary embodiment of the determination device according to the invention.

According to the exemplary embodiment of FIG. 6, the first and the second pulses 11, 12 are guided via waveguides in the form of two glass fibers 111, 112, which e.g. sectionally extend in a groove in a substrate 113 (e.g. a silicon substrate) (waveguide platform), wherein the saturable absorber 5 can be arranged e.g. directly on an end face or in a groove of the substrate 113. The detector 6 can be arranged freely in the space behind the platform (the substrate 113) or also be mounted on the same. In this way, a compact and in particular adjustment-free as well as robust synchronization device can be realized. It is of course also conceivable that instead of the glass fibers 111, 112 integrated waveguides are used.

The glass fibers 111, 112 extend at an angle to each other, wherein the detector 6 is arranged in an extension of the lower glass fiber 112, so that the second pulses 12 guided in the glass fiber 121, but not the first pulses 11 guided in the upper glass fiber 111 will get to the detector 6.

Figure 7:
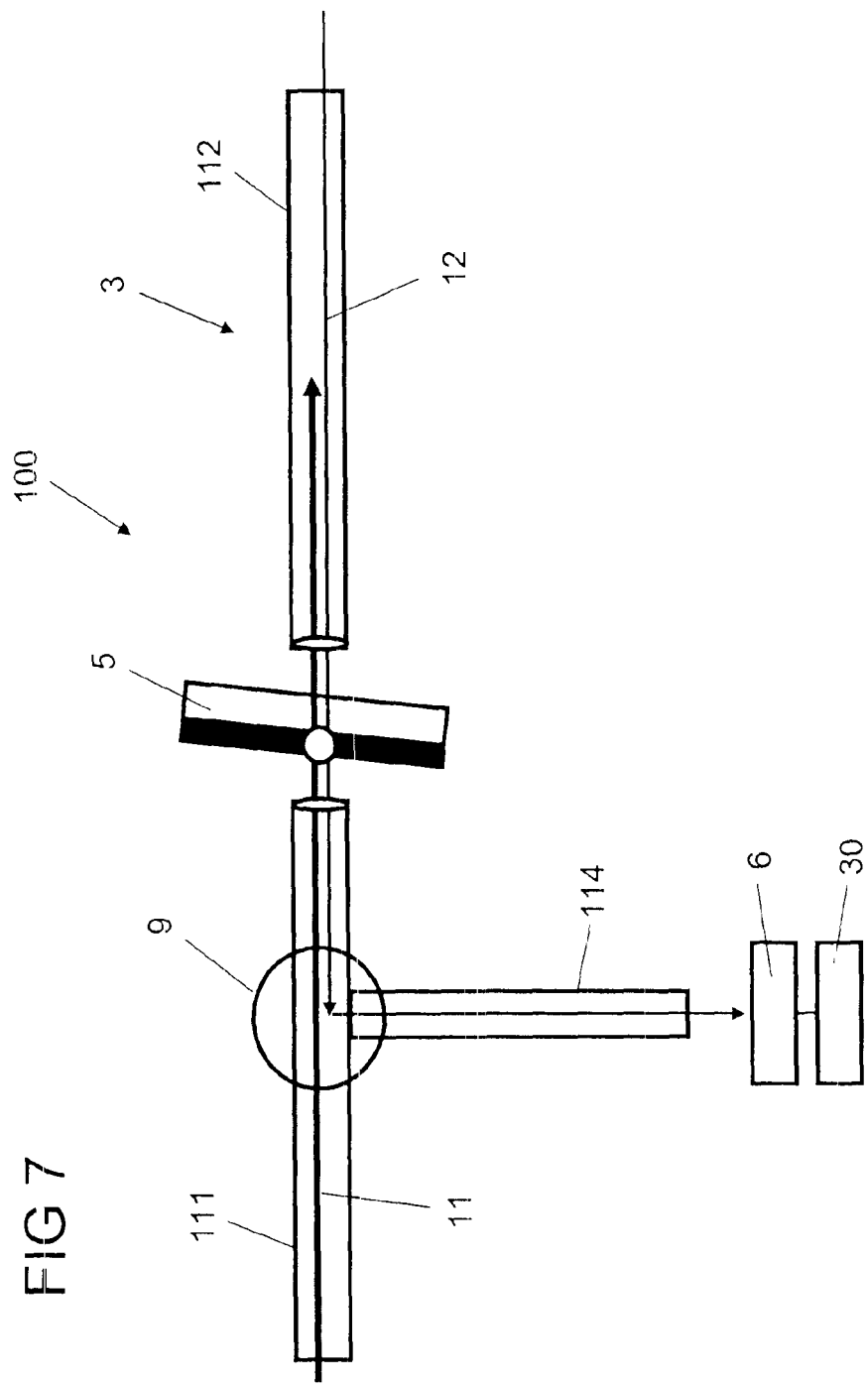
FIG. 7 shows a fourth exemplary embodiment of the determination device according to the invention.

In the exemplary embodiment of FIG. 7 the saturable absorber 5 is arranged between the ends of two glass fibers 111, 112, with which the first and the second pulses 11, 12 are guided to the absorber 5 in opposite directions and e.g. via optical systems each formed at the fiber ends are irradiated into the saturable absorber. After passing through the saturable absorber 5, the first and the second pulses 11, 12 are guided away from the absorber 5 in the respectively other glass fiber 111, 112. In the region of the first glass fiber 111 a circulator 9 is located, via which the second pulses 12 that have passed through the saturable absorber 5 are coupled into a third glass fiber 114 and via the same are guided to the detector 6.

Figure 8:
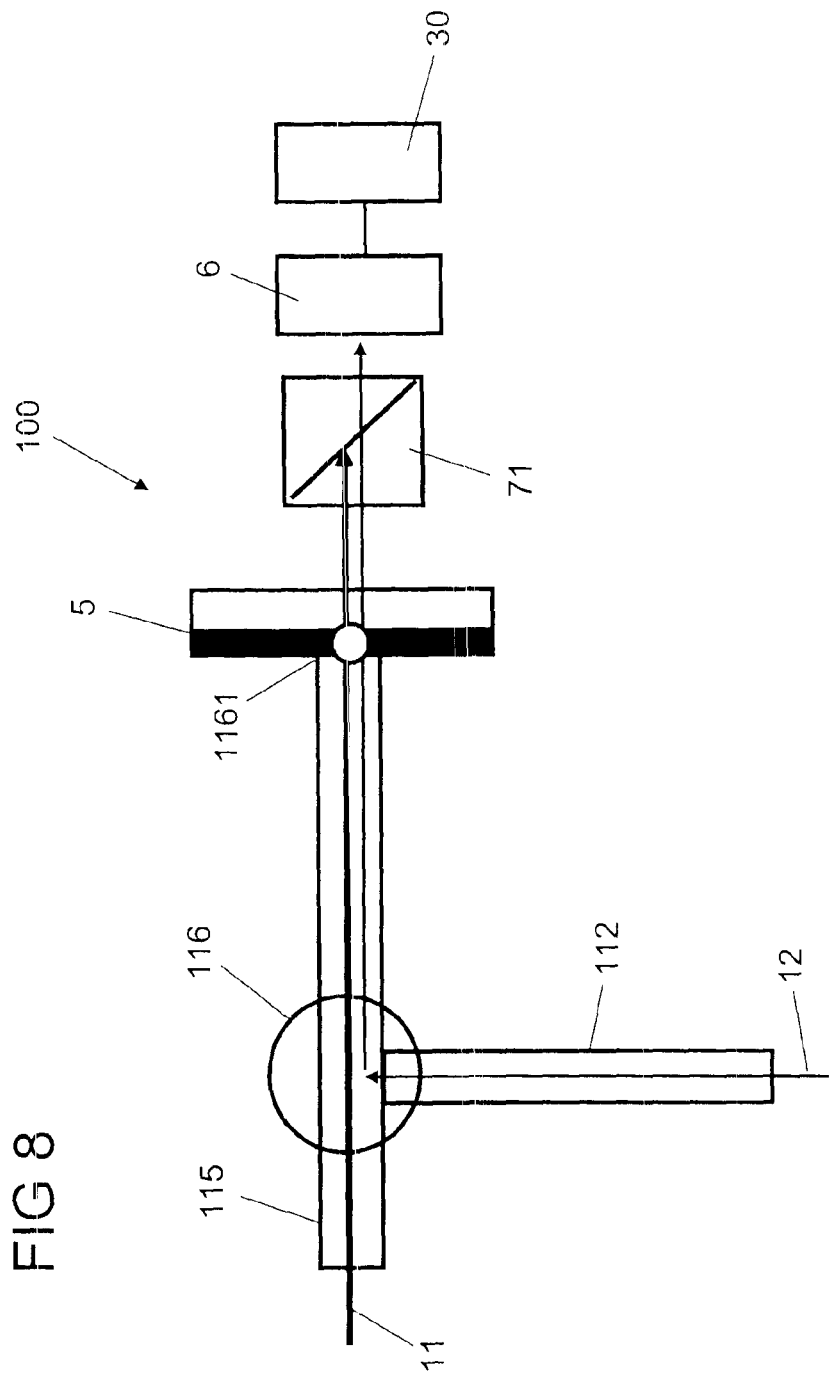
FIG. 8 shows a fifth exemplary embodiment of the determination device according to the invention.

As shown in FIG. 8, it is also possible that the first and the second pulses 11, 12 are polarized vertically to each other, wherein it is prevented by means of a polarizing filter 71 arranged behind the saturable absorber 5 that the first pulses 11 get to the detector. In this exemplary embodiment, the first and second pulses 11, 12 each are coupled into the TE and TM axis of a common polarization-maintaining glass fiber 115, wherein the second pulses 12 are coupled into the common glass fiber 115 via a (likewise polarization-maintaining) glass fiber 112 and a polarization combiner 116.

A further variant—not shown here—is possible when the first and second pulses 11, 12 have different wavelengths. Instead of a polarizing filter—like in FIG. 8—a wavelength filter then is mounted in front of the detector for blocking the first pulses 11. With an absorber (e.g. of InGaAs on InP) fiber lasers thus can be synchronized to each other in a range of 1600 to 1000 nm. The synchronization to shorter-wave lasers—e.g. Ti:sapphire lasers at 800 nm—also is possible. Here, the InP substrate absorbing to a short wavelength of 920 nm even replaces the wavelength filter.

In this variant, as already mentioned above, it is conceivable that the saturable absorber 5 (e.g. in the form of a chip) is connected with an output facette 1161 of the common glass fiber 115. The polarizing filter 7 in turn can be connected with the detector 6.

Figure 9:
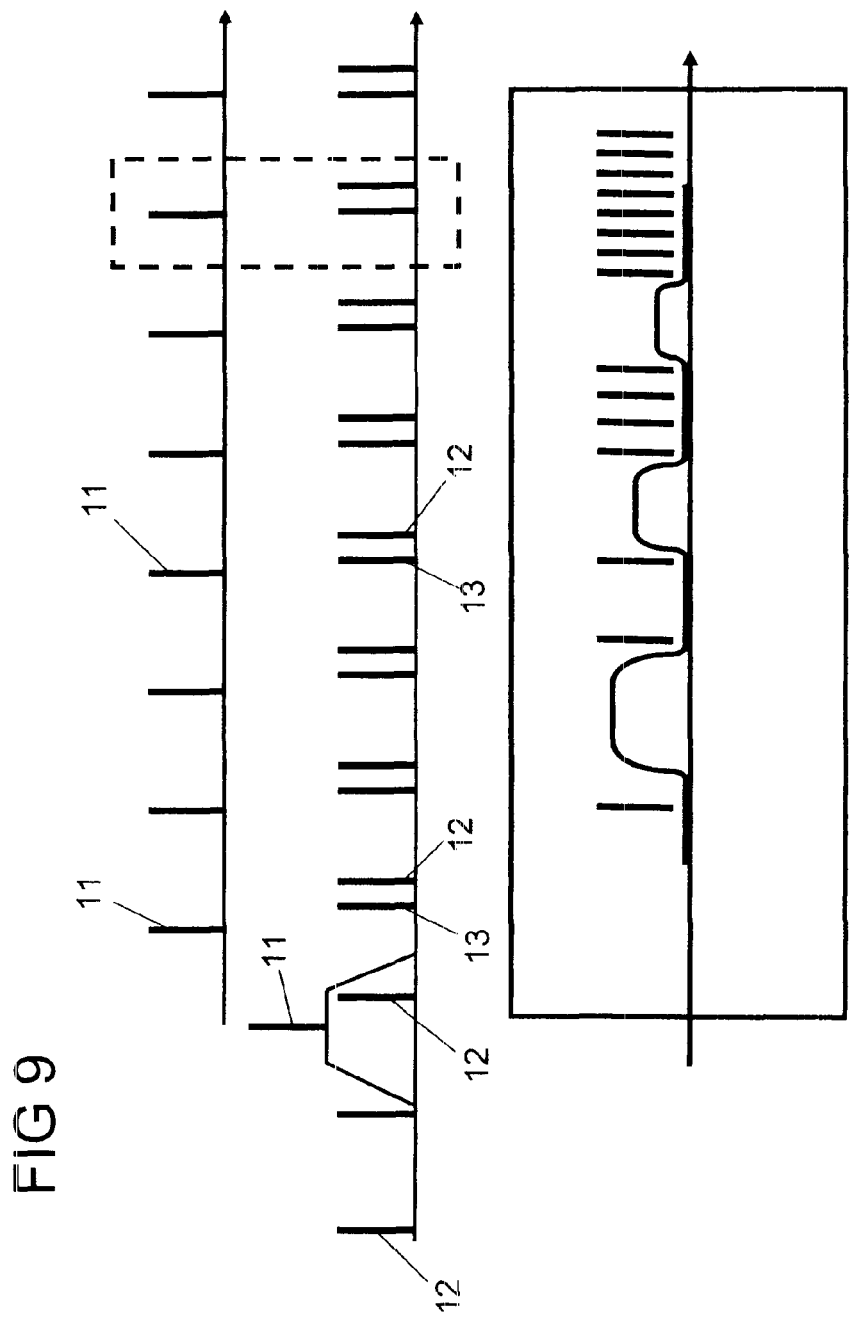
FIG. 9 shows an illustration of a sixth exemplary embodiment of the determination device according to the invention.

FIG. 9 relates to a development of the invention according to which a sequence of third pulses 13 is generated from the second pulses 12, e.g. by means of a beam splitter. The third pulses 13 are irradiated into the saturable absorber 5 with a specified (i.e. known) time delay with respect to the second pulses 12 (upper representation of FIG. 9). Since the delay with which the third pulses 13 are combined with the second pulses 12 is known, the temporal distance of the maxima or rising edges occurring in the detector signal due to the second and third pulses 12, 13 also is known, so that this distance can be used for time calibration with respect to the second pulses 12, as already explained above.

Figure 10A:
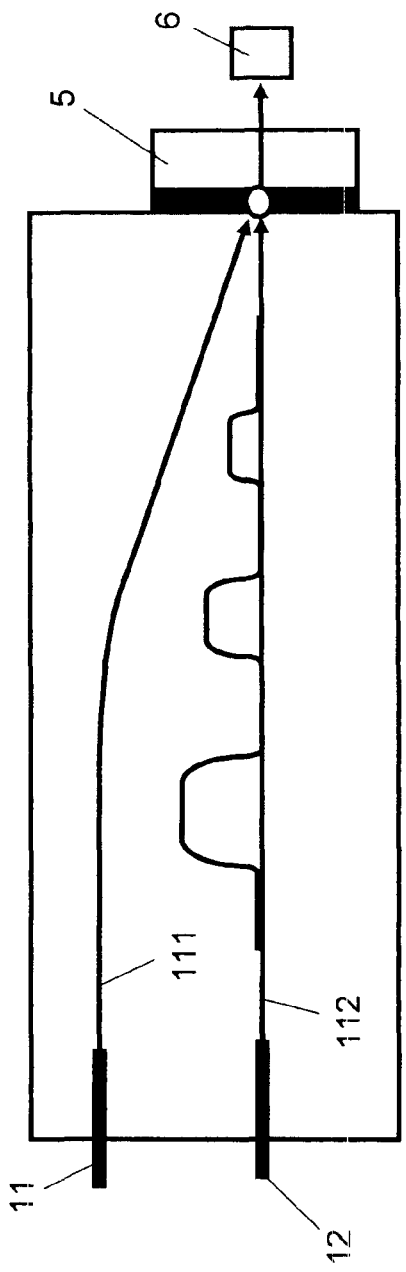
FIGS. 10A, 10B show a sixth exemplary embodiment of the determination device according to the invention.
Figure 10B:
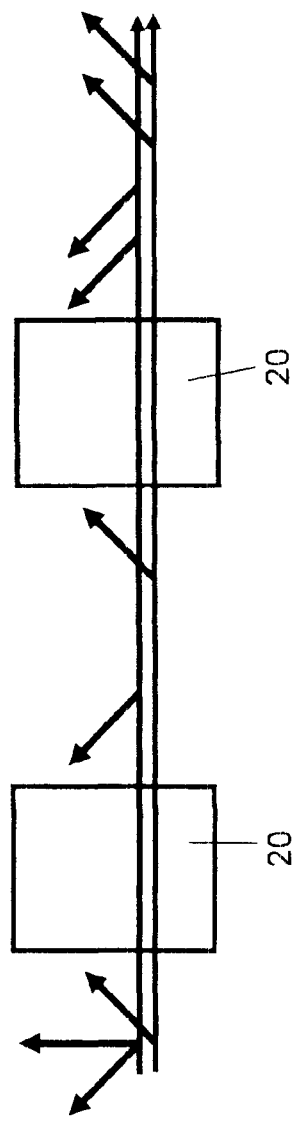

FIGS. 10A and 10B concern possible realizations of the principle of FIG. 9. In FIG. 10A a waveguide platform similar to FIG. 6 is utilized, in order to e.g. be able to realize self-cascaded delays in a precise and robust way and in particular combine the same with the design of FIG. 6 at low cost.

According to FIG. 10B, the second pulses 12 are coupled into a polarization-maintaining fiber 112 at an angle (of e.g. 45°), whereby a fast and a slow wave is formed in the fiber, so that the third pulses 13 are formed in the fiber 112. Depending on the length of the fiber line further additional pulses can be formed, as indicated in the bottom representation of FIG. 9, with the intensity of the first pulses decreasing.

Instead of the angular coupling into a polarization-maintaining fiber, other elements, in particular other birefringent elements, can of course also be used, in order to generate the third pulses 13. For example, birefringent crystals 20 can be used (FIG. 10B). It is of course also conceivable that beside the third pulses further sequences of pulses are generated, which have a known time delay with respect to the first, second and third pulses 11, 12, 13.

Figure 11:
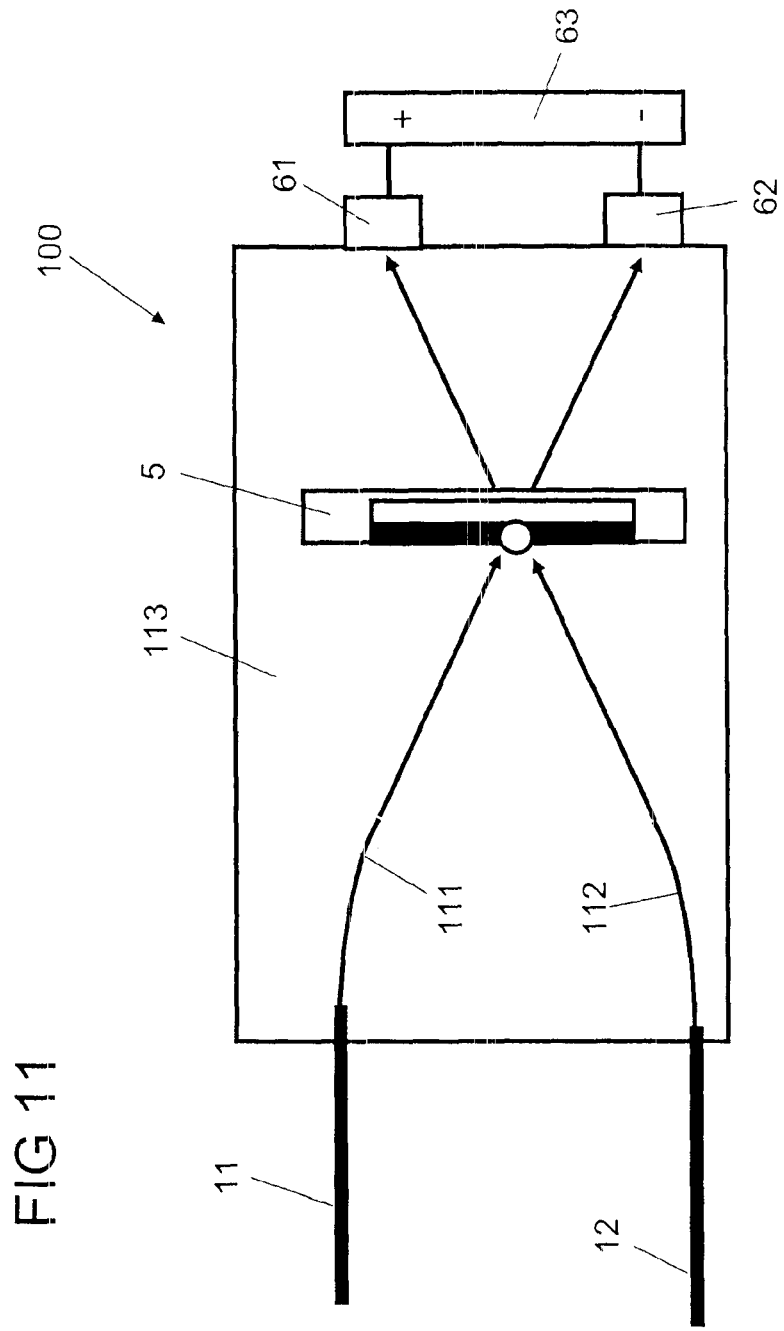
FIG. 11 shows a seventh exemplary embodiment of the determination device according to the invention.

According to the exemplary embodiment of FIG. 11, a second detector 62 for detecting the first pulses 11 is present beside a first detector 61 for detecting the second pulses 12. The first detector 61 is arranged in an extension of the propagation direction of the second pulses 12 such that it only detects these pulses and not the first pulses 11. Conversely, the second detector 62 is located in an extension of the propagation direction of the first pulses 11, so that it only can detect the first pulses 11. The signals of the two detectors 61, 62 are passed to a difference former 63, in which the difference of the signals of the detectors 61, 62 is formed. In dependence on the difference, a controller can vary e.g. the repetition frequency and/or the amplitude of the modulation of the repetition frequency with respect to the first and/or second pulses 11, 12, in order to synchronize the pulses ("balanced detection").

Figure 12:
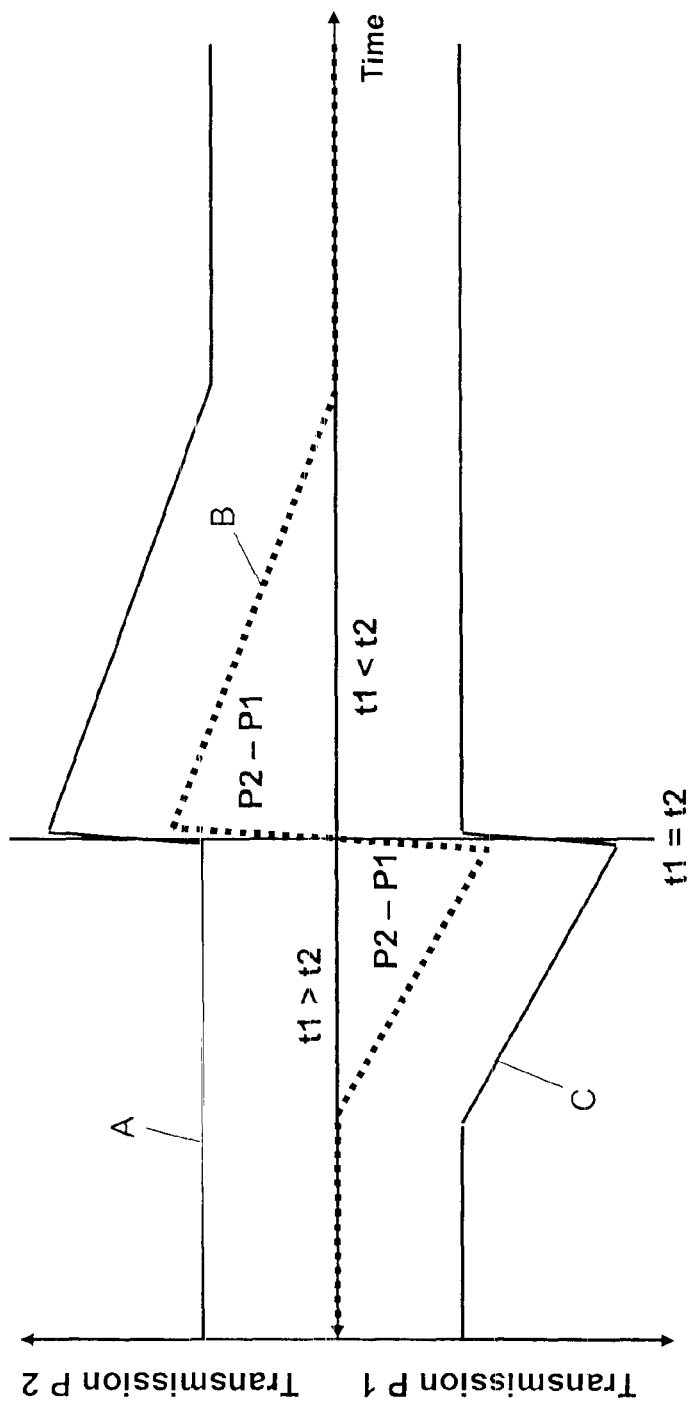
FIG. 12 shows an illustration of the exemplary embodiment of FIG. 11.

As already explained above, the first pulses 11 only have an effect on the transmission of the absorber 5 with respect to the second pulses 12 ("Transmission P2" in FIG. 12, curve A) when they reach the saturable absorber 5 before the second pulses 12. Conversely, the transmission of the absorber 5 is increased with respect to the first pulses 11, when the second pulses 12 first arrive in the absorber 5 ("Transmission P1" in FIG. 12, curve B). In the first case, the difference between the signal of the second detector 62 (corresponding to the transmission of the first pulses "P1") and the signal of the first detector 61 (corresponding to the transmission of the second pulses "P2") thus is negative (curve C in FIG. 12). In the second case, the difference of the detector signals is positive. When the pulses overlay each other in the saturable absorber exactly at the same time, the difference is zero.

This exemplary embodiment can be used e.g. for a control on a fixed operating point, such as when synchronizing on a master laser, wherein with reference to the detector signal not only the point of the optimum synchronization can be determined, but also the required control direction, as likewise already explained above.

Figure 13:
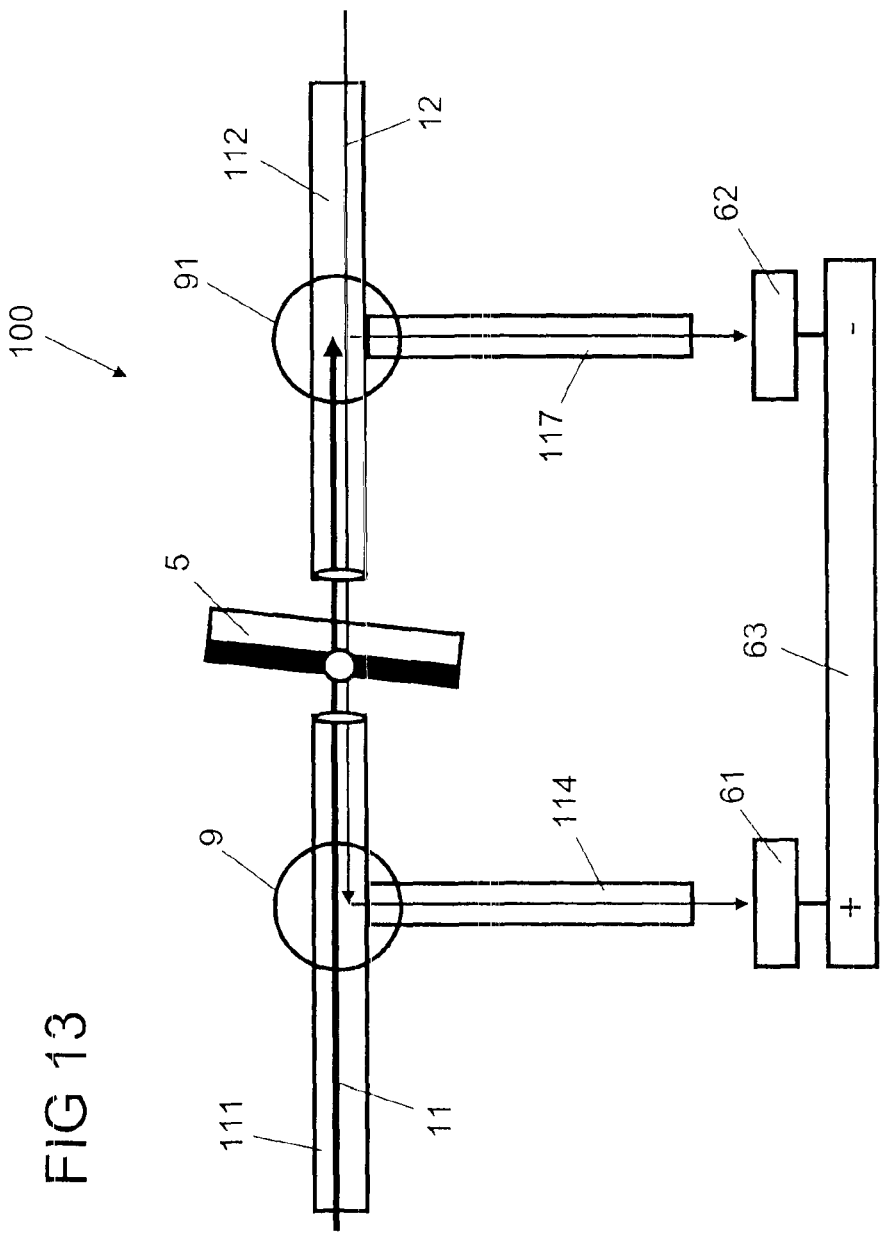
FIG. 13 shows an eighth exemplary embodiment of the determination device according to the invention.

The described "balanced detection" can of course be used with all of the above-described exemplary embodiments. For example, as shown in FIG. 11, a waveguide platform similar to FIG. 6 can be used, according to which the first and second pulses each are guided to the absorber 5 via a glass fiber 111, 112. According to FIG. 13, similar to FIG. 7, the saturable absorber 5 in addition can be arranged between two glass fibers 111, 112, which pass the first and second pulses 11, 12 onto the saturable absorber 5 in opposite directions, wherein the second pulses 12 are received by a first detector 61. According to FIG. 13, a second circulator 91 is provided, which couples the first pulses 11 that have passed through the absorber 5 from the second glass fiber 112 into a fourth glass fiber 117, wherein in the fourth glass fiber 117 the first pulses 11 are passed to a further (second) detector 62.

Figure 14:
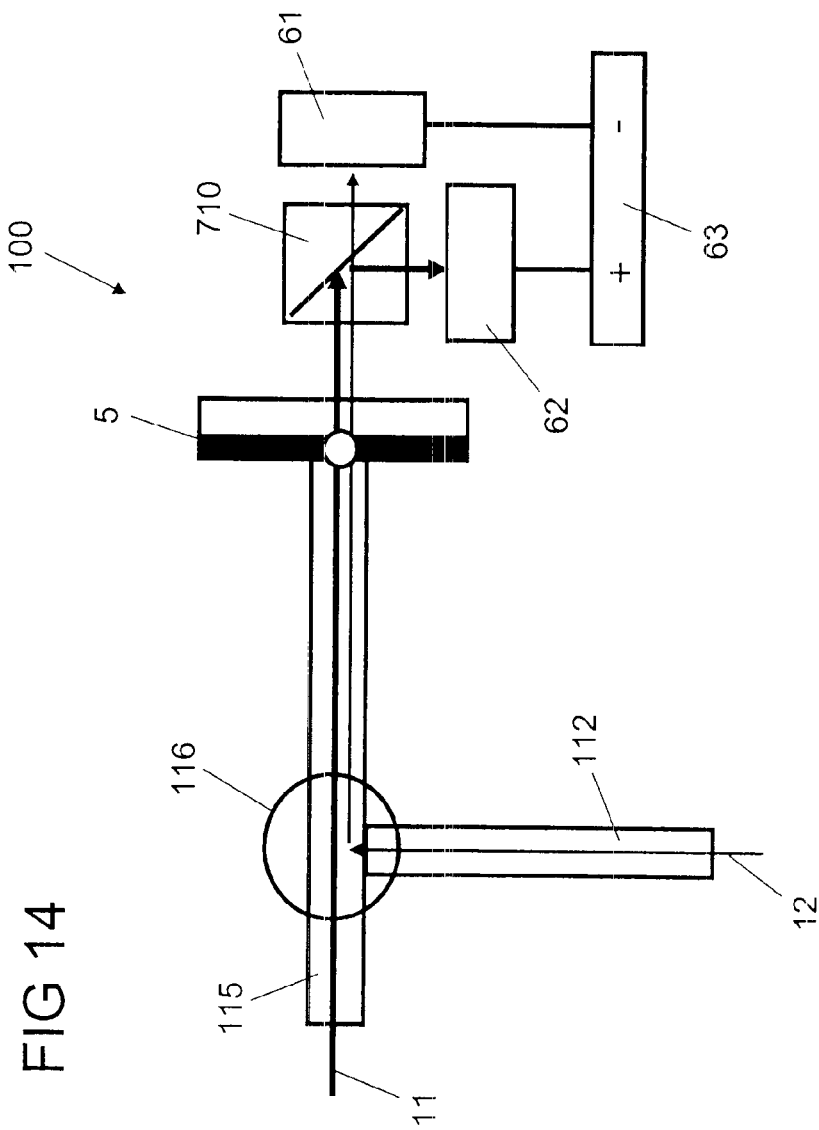
FIG. 14 shows a ninth exemplary embodiment of the determination device according to the invention.

The design variant of FIG. 14 corresponds to FIG. 8, wherein via a polarization splitter 710 arranged behind the saturable absorber 5 such a separation of the first and second pulses 11, 12 that have passed through the saturable absorber 5 is made that the second pulses 12 fall onto a first detector 61 and the first pulses 11 fall onto a second detector 62.

It should be noted that the determination devices described in connection with the exemplary embodiments need not necessarily be part of a synchronization device. Rather, it is also conceivable that these determination devices merely are used as measuring device for determining the relative temporal position of the first and the second pulses, without a synchronization of the pulses being effected.

LIST OF REFERENCE NUMERALS 1, 1a, 1b, 101, 102 laser
2 delay line
3 synchronization device
4 glass fiber
5 saturable absorber
6, 61, 62 detector
7 polarizing filter
8 optical imaging system
9, 91 circulator
10 pump-probe measurement
11 first pulse
12 second pulse
20 birefringent element
13 third pulse
30 detection unit
31 time correlator
32 controller
33, 33a, 33b optical imaging system
63 difference former
71 polarizing filter
100 determination device
111, 112, 114, 117 glass fiber
113 substrate
115 polarization-maintaining fiber
116 polarization combiner
710 polarization splitter
1161 end face

The invention claimed is:

1. A method for determining the relative temporal position of electromagnetic pulses, comprising the following steps:
generating a sequence of first electromagnetic pulses;
generating a sequence of second electromagnetic pulses;
overlaying at least a part of the first and the second pulses in a saturable absorber;
detecting the second pulses that have passed through the saturable absorber by means of a detector in such a manner that the second pulses, but not the first pulses that have passed through the saturable absorber, are detected; and
determining the temporal position of the first pulses relative to the temporal position of the second pulses by means of a signal of the detector generated upon receipt of the second pulses that have passed through the saturable absorber.

2. The method according to claim 1, wherein the determination of the relative temporal position of the pulses comprises the detection of a change of the signal of the detector.

3. The method according to claim 2, wherein the detection of the change of the signal of the detector comprises the detection of a rise of the signal of the detector.

4. The method according to claim 1, wherein by using the determined relative temporal position of the pulses a synchronization of the first and the second pulses is effected.

5. The method according to claim 4, wherein synchronizing is effected by a controller which in dependence on the signal of the detector varies the relative temporal position of the first and second pulses and/or the repetition frequency of the first and/or second pulses.

6. The method according to claim 4, wherein synchronizing the first and the second pulses comprises a detection of rising edges and/or maxima of the intensity of the second pulses arriving at the detector.

7. The method according to claim 1, wherein the signal of the detector used for determining the relative temporal position of the pulses at least approximately corresponds to a power of the second pulses that have passed through the saturable absorber, which is averaged over several pulses.

8. The method according to claim 1, wherein the integral power of a pulse of the second pulses is smaller than the integral power of a pulse of the first pulses.

9. The method according to claim 1, wherein the first and the second pulses are irradiated into the saturable absorber at an angle to each other, wherein the detector is arranged on the propagation axis of the second pulses.

10. The method according to claim 1, wherein the first and/or the second pulses are guided to the saturable absorber in a waveguide.

11. The method according to claim 1, wherein the first and the second pulses run through the saturable absorber in opposite directions, wherein the second pulses that have passed through the saturable absorber are passed onto the detector via a circulator.

12. The method according to claim 1, wherein the first and the second pulses are polarized differently, wherein by means of a polarizing filter the first pulses are prevented from getting to the detector.

13. The method according to claim 1, wherein a sequence of third pulses is generated from the first or the second pulses, which are irradiated into the saturable absorber with a specified time delay with respect to the first or the second pulses.

14. The method according to claim 13, wherein the temporal distance of the rising edges or maxima occurring in the signal of the detector due to the second and the third pulses is used for time calibration with respect to the second pulses.

15. The method according to claim 1, wherein by means of a further detector the first pulses are detected, wherein the determination of the relative temporal position of the first and the second pulses is effected in dependence on a difference of the signals of the two detectors.

16. A determination device for carrying out the method according to claim 1, comprising
at least one pulse generating device for generating a sequence of first electromagnetic pulses and a sequence of second electromagnetic pulses;
a saturable absorber in which the first and the second pulses can be overlaid; and
a detector for detecting pulses that have passed through the saturable absorber, wherein the detector is formed and arranged such that it detects the second pulses that have passed through the saturable absorber, but not the first pulses that have passed through the saturable absorber.

17. The determination device according to claim 16, further comprising a detection unit which detects a change and/or maxima of the signal of the detector.

18. The determination device according to claim 17, wherein the detection unit detects the change of the signal of the detector by detection of a rise of the signal of the detector.

19. The determination device according to claim 16 wherein the pulse generating device includes at least one fiber laser for generating the first and the second pulses.

\* \* \* \* \*